United States Patent [19]

Konen et al.

[11] Patent Number: 5,465,637

[45] Date of Patent: Nov. 14, 1995

[54] WIRE STRIPPING METHOD AND MACHINE

[75] Inventors: Bruce P. Konen, Aurora; Robert W. Van Naarden, Hinckley, both of Ill.

[73] Assignee: Ideal Industries, Inc., Sycamore, Ill.

[21] Appl. No.: 223,228

[22] Filed: Apr. 5, 1994

[51] Int. Cl.[6] ..................................................... H02G 1/12
[52] U.S. Cl. .................................................. 81/9.51; 29/825
[58] Field of Search ............................. 81/9.51; 29/825, 29/426.1, 426.3, 426.4

[56] References Cited

U.S. PATENT DOCUMENTS

| 4,261,230 | 4/1981 | Sindelar | 81/9.51 |
| 4,283,971 | 8/1981 | Hetmanski | 81/9.51 |
| 4,672,865 | 6/1987 | Nespor | 81/9.51 |
| 4,736,501 | 4/1988 | Fujimoto | 81/9.51 |
| 4,993,147 | 2/1991 | Carpenter et al. | 29/825 |

*Primary Examiner*—Bruce M. Kisliuk
*Assistant Examiner*—Joni B. Danganan
*Attorney, Agent, or Firm*—Dorn, McEachran, Jambor & Keating

[57] ABSTRACT

A method and apparatus for removing insulation from the ends of electrical wires. The wire processing machine has a pair of turning mechanisms each driving a set of feed wheels, one set on either side of a pair of reciprocating V-notch shaped cutting blades. The feed wheels grip a wire for feeding it into and out of the cutting zone of the blades. Each set of feed wheels and its turning mechanism are mounted on a reciprocating table. A rotation mechanism causes the feed wheels to reciprocate in opposed directions transverse to the wire axis for the purpose of rotating the wire about its axis. The cutting blades close upon a wire positioned for stripping, cutting less than the full circumference of the insulation. With the blades closed and stationary, the rotation mechanism is activated to rotate the wire, thereby completing a full encircling cut of the insulation. The feed wheels advance the wire with the blades closed to remove the insulation slug.

7 Claims, 6 Drawing Sheets

WIRE STRIPPING METHOD AND MACHINE

BACKGROUND OF THE INVENTION

This invention relates to a wire processing machine for removing insulation from a wire. Machines of this type are designed to cut partially or fully through the thickness of the insulation layer or jacket of an electrical wire and remove the resulting end portion (called a slug) of the insulation, exposing a bare conductor at the wire's end.

It is known in prior wire processing equipment to remove an insulation slug by closing cutting blades on the wire, rotating the blades around the circumference of the wire and then pulling the slug off. Gudmestad, U.S. Pat. No. 3,951,016 is an example of a rotary wire stripper. Other devices use V-notch shaped cutting blades which do not rotate but instead make a partial cut on four sides of the circumference, with uncut portions being broken away upon slug removal. Kodera, U.S. Pat. No. 4,802,512 is an example. Kodera also provides for rotation of the wire during slug removal to twist the exposed end of the wire.

Sindelar, U.S. Pat. No. 4,261,230 has a pair of opposed flat or straight-edged blades. A full encircling cut of the insulation is effected by opposing movement of the blades transverse to the wire axis to roll the wire between the blades. Subsequent simultaneous transverse and axial movement of the blades twists the end of the wire.

The present invention arose from the need to strip coaxial cable. Coaxial cable has an outer insulation jacket, a shield layer, an inner dielectric or insulation layer and a conductive core. The outer jacket, shield layer and dielectric layer all have to be removed to prepare the cable for use. These layers are typically thick or made of hard to strip material, or both. In any case, acceptable stripping of coaxial cable requires a full encircling cut of the layers, making the use of stationary flat or V-notch shaped blades unsuitable. Accordingly, coax stripping is currently done by machines which have rotating blades.

SUMMARY OF THE INVENTION

The present invention involves a different approach which simplifies the equipment needed to stripwire. According to the method of the present invention, V-notch shaped cutting blades are closed on the wire at the desired location and then the blades are held fixed while the wire is rotated. Since the V-notch shaped blades form a square opening around the wire, the wire will only have to be rotated slightly more than 90 degrees, preferably between 90 and about 100 degrees, to get full circumferential cutting of the insulation. This approach has advantages with ordinary wire, as well as with coax. On larger wire sizes such as 8, 10 and 12 gauge wire, V-notch shaped blades will only cut roughly 50%–60% of the insulation which is not enough to permit clean slug removal. Rotation of the wire in accordance with this invention permits stripping of these larger sizes without having to rotate the cutting blades.

In an alternate embodiment, the rotation of the wire is started while the blades are moving toward the closed position. In this fashion the initial contact between the insulation and cutting blade edges is a tangential slicing action rather than a straight radial penetration of the blades. On certain insulation materials this may be advantageous. Rotation of the wire may be in two directions, i.e., a reciprocating rotation, during blade closure.

In a further alternate embodiment, the invention can be adapted for use on weak, stranded wires that would not stand up to relative rotation of the cutting blades and the wire. Instead the V-notch shaped cutting blades are closed to partially cut the circumference of the insulation, then the blades are opened and the wire rotated partially to present an uncut portion of the insulation to the blades. The blades close and open on this new portion of the wire. The process is repeated until a full, encircling cut has been made whereupon, prior to opening the blades for the last time, the slug is removed.

The method described above is performed by a wire processing machine having first and second pairs of feed wheels mounted for rotation on either side of reciprocating V-notch shaped cutting blades. The feed wheels are mounted on shafts driven by a turning means to grip and feed a wire into and out of the cutting blades. A wire rotation mechanism causes reciprocation of the shafts and feed wheels, which in turn causes rotation of the wire about its axis. The shafts and turning means are mounted on a reciprocating table such that operation of the wire rotation mechanism does not interfere with the turning means.

DETAILED DESCRIPTION OF THE INVENTION

Figure 1:
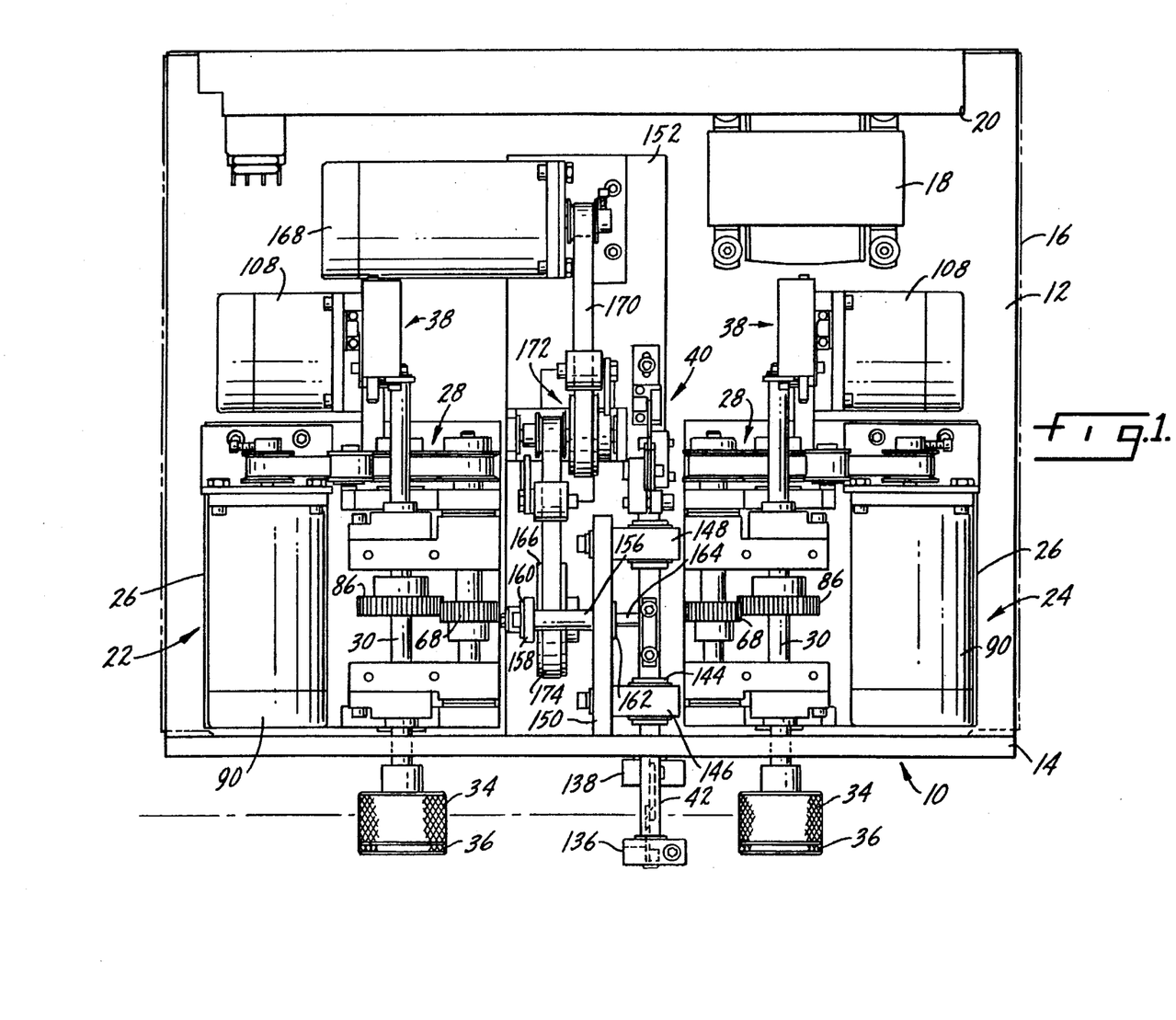
FIG. 1 is a schematic plan view of a wire processing machine of the present invention, with the control panel and top of the case removed to show the mechanical components.
Figure 2:
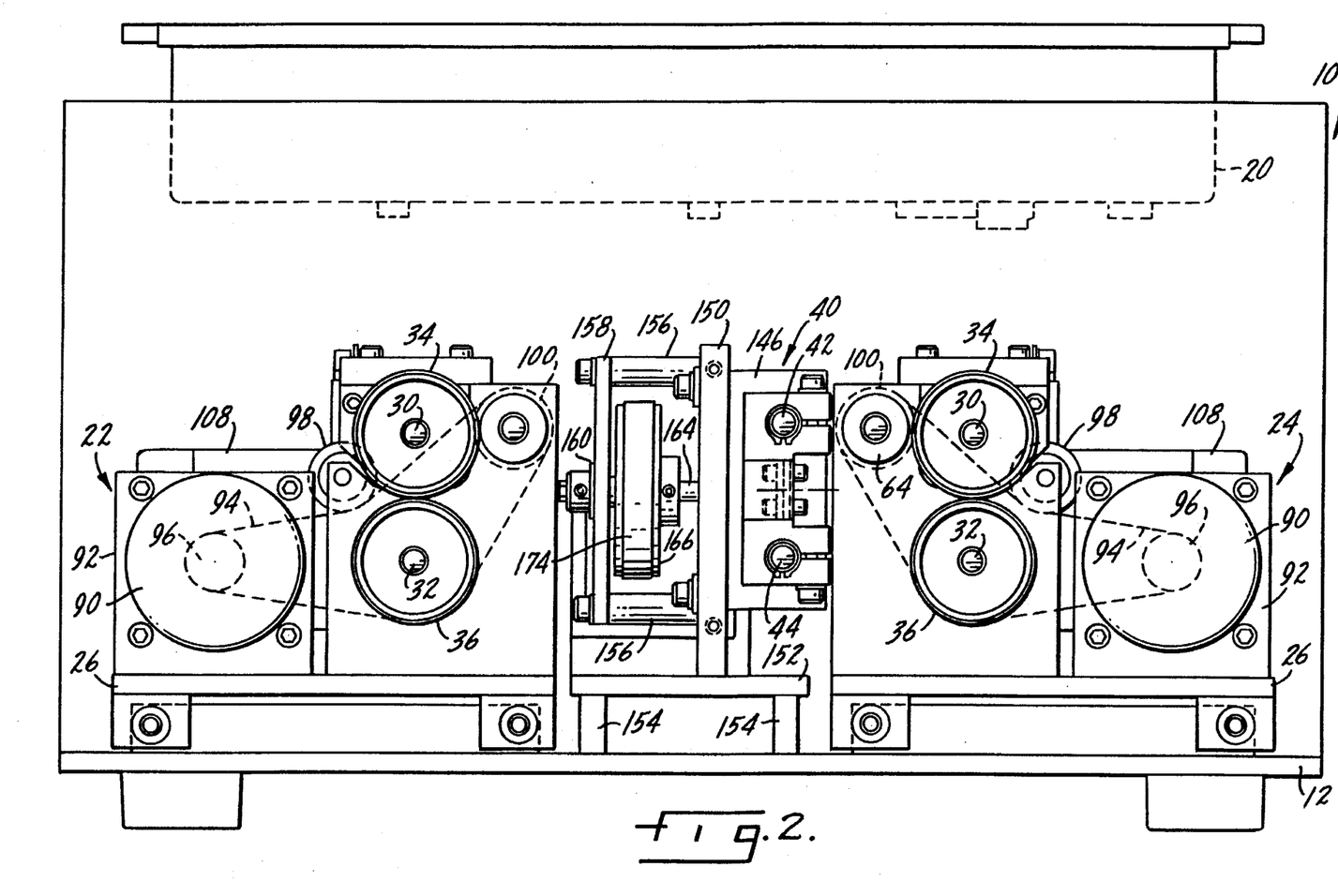
FIG. 2 is schematic front elevation view of the wire processing machine of FIG. 1, on an enlarged scale, with the front wall removed to show the mechanical components.

A wire processing machine according to the present invention is shown in FIGS. 1 and 2 generally at 10. The machine has a frame including a base plate 12 and a front wall 14. There is a case (not shown) which encloses most of the machine. A transformer 18 is provided near the rear corner of the base plate 12. A control panel and electronics module are shown schematically at 20 in FIG. 2. The electronics module will include a programmable logic controller or similar computer allowing the user to set the parameters for a particular job such as wire length, strip length, depth of cut, number of wires to be made etc. An electronic storage device is provided to retain settings for a desired job. The controller activates the various motors as explained below to effect the stripping job set by the user.

The major mechanical components are shown in FIGS. 1 and 2. These include left and right wire translation units 22 and 24. Each wire translation unit includes a table 26 slidably mounted on the base plate 12 and a turning means 28 mounted on the table for rotating first and second drive shafts 30 and 32. The drive shafts are mounted for rotation on the table and extend through the front wall 14. First and second feed wheels 34 and 36 are fixed to the shafts in front of the front wall. The feed wheels are located in close proximity to each other so as to be engageable with a wire to be stripped. Rotation of the feed wheels advances or retracts a wire to or from the cutting blades.

A wire rotation means 38 is associated with each wire translation unit 22, 24. The rotation means is a dual rack and pinion driven by a motor to cause reciprocation of the table 26 and first drive shaft 30 in a direction transverse to the wire. This in turn causes rotation of the wire about its axis as will be explained below.

Between the wire translation units is a cutting blade drive means 40. It has a motor and drive belt mechanism for reciprocally driving upper and lower blade mounting shafts 42 and 44. Details of the blade drive means are discussed below.

Figure 3:
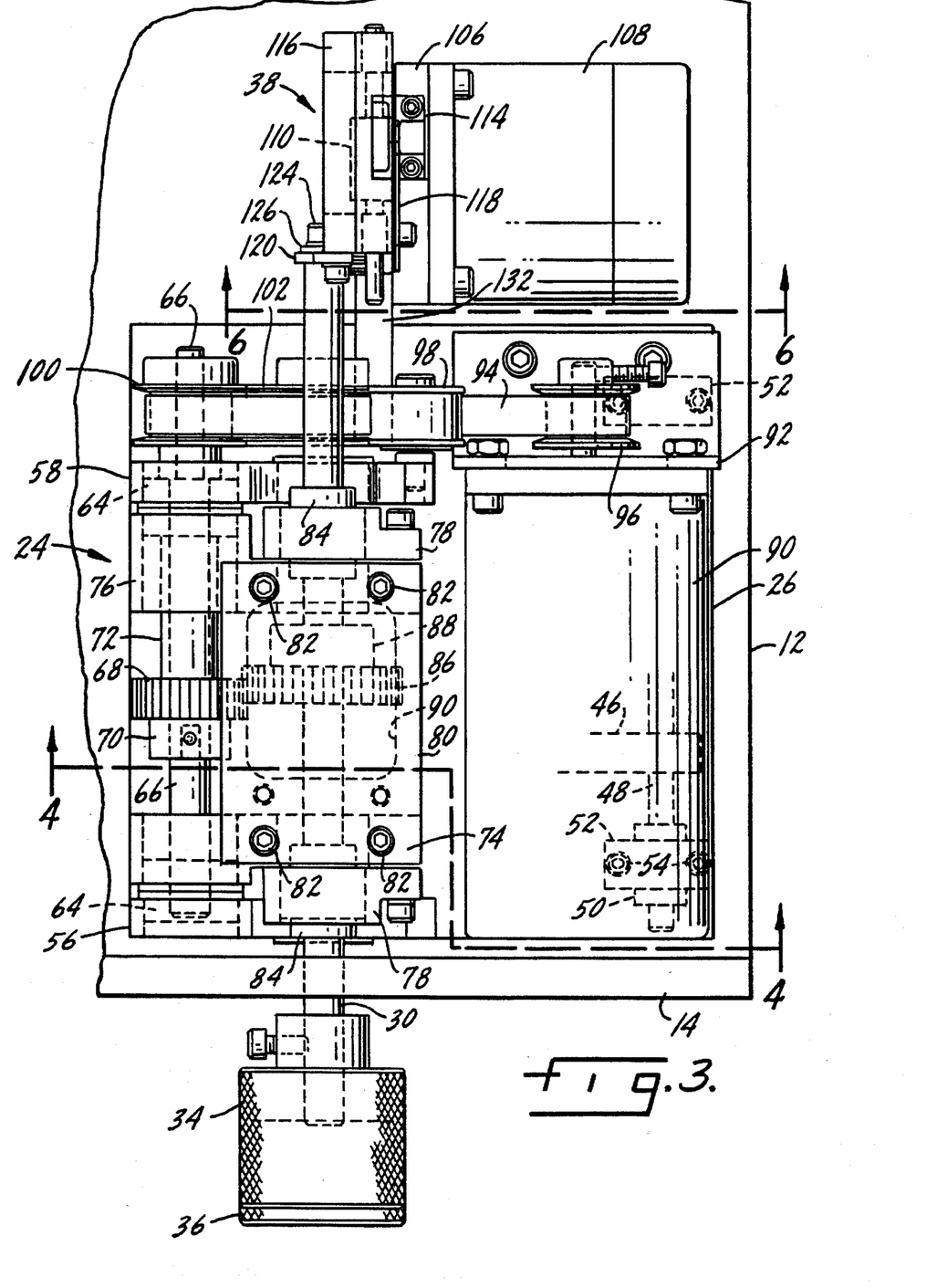
FIG. 3 is a plan view, on an enlarged scale, of the wire translation means and rotation means.
Figure 4:
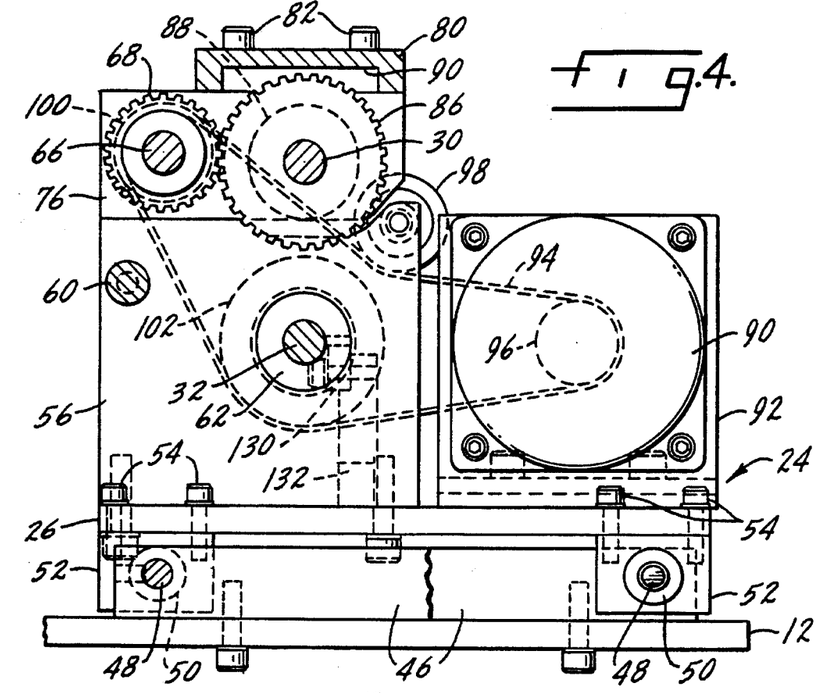
FIG. 4 is a section taken along line 4—4 of FIG. 3.
Figure 5:
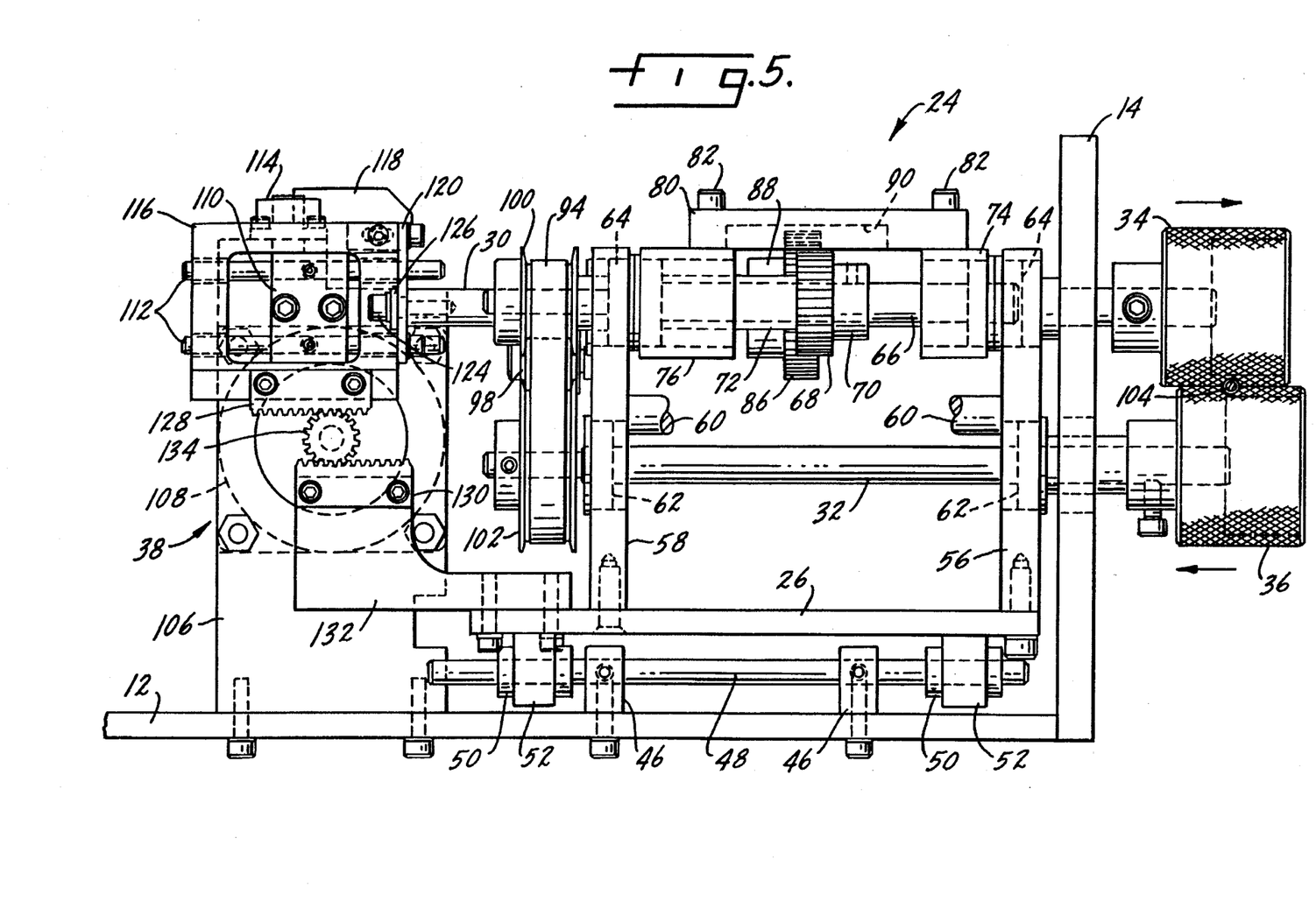
FIG. 5 is a side elevation of the wire translation means and rotation means, on an enlarged scale, with portions cut away and background omitted for clarity.

Turning now to FIGS. 3–5, details of the wire translation units and wire rotation means will be described. It will be understood that there are two such units which are substantially mirror images of each other so only one of the units will be described here. Two shaft support bars 46 are fixed to the base plate 12 and extend parallel to the front wall 14. The bars 46 each have aligned openings for receiving two support shafts 48. The shafts 48 have flats engaged by set screws to fix the shafts in the support bar openings. Ball bushings 50 fixed in bearing blocks 52 slidably engage the shafts 48. The bearing blocks 52 are fastened to the table 26 by bolts 54. Thus, the table 26 is slidable toward and away from the front wall 14 on the stationary support shafts 48.

Front and rear bearing support walls 56 and 58 are bolted to the table. The walls are joined by a stiffening rod 60, shown in FIGS. 4 and 5. The walls 56 and 58 have openings in which bearings 62 fit. The bearings 62 support the second or lower drive shaft 32 for rotation. The upper left corners of the walls 56 and 58 have bores which receive bearings 64 to rotatably mount an idler shaft 66. The idler shaft extends through the rear wall 58 to mount a timing pulley as described below. Near the middle of the idler shaft there is a spur gear 68 held in place by a screw locking the spur gear hub 70. A spacer 72 (FIG. 3) prevents axial movement of the gear 68.

Since the spacing the between the feed wheels 34 and 36 must be adjustable to accommodate various wire sizes, the first or upper drive shaft 30 is adjustably mounted. In effect, shaft 30 is suspended from the idler shaft 66 by a support structure. The support structure includes front and rear arms 74 and 76 each having a gear adjustment block 78 bolted to it. A bracket 80 overlies the two arms and is connected to them by bolts 82. The arms 74 and 76 each have left and right bores through which the idler shaft 66 and drive shaft 30 extend. The gear adjustment blocks 78 also have a bore aligned with the right bore of the arms. The bores each receive bearings. A bearing (not shown) in each arm fits over the idler shaft 66 allowing the shaft to rotate within the bearing and the arms to pivot about the shaft. The other bearing is a rotating linear bearing set 84 (FIG. 3). These bearings are mounted in the gear adjustment blocks 78. The linear bearings sets allow both rotational and linear motion of the first drive shaft 30. Thus it can be seen that the bearings 84 for the drive shaft 30 are suspended from the idler shaft 66 by the support structure.

The support structure is biased by a spring and lever (not shown) such that the feed wheels are urged toward one another. The amount of spring tension on the support structure is adjustable, as is the initial gap between the feed wheels.

The first drive shaft 30 carries a spur gear 86 fixed thereon by a locking screw on the spur gear hub 88. A depression 90 in the bracket 80 provides clearance to allow rotation of the spur gear. The spur gear 86 engages the gear 68 on the idler shaft 66 to drive the shaft 30. The teeth of spur gears 68 and 86 allow relative axial motion between the gears.

The drive shafts 30 and 32 are driven by a stepper motor 90 and belt drive. The motor 90 is bolted to a bracket 92 which in turn is fastened to the table 26. The motor drives a timing belt 94 through drive pulley 96. The upper run of the belt 94 traverses an idler 98 (which is rotatably mounted on the rear wall 58) and passes under the first drive shaft 30. Then the belt engages a pulley 100 fixed to the end of the idler shaft 66 for driving the shaft and its spur gear 68. Engagement of the spur gears 68 and 86 results in rotation of the first drive shaft 30. The return run of the belt 94 drives a second pulley 102 which is fixed to the end of the second drive shaft 32. This results in rotation of the second drive shaft in the opposite direction of the first drive shaft 30. This oppositely directed rotation of the drive shafts and their feed wheels 34, 36 results in translation, either advancing or retracting, of a wire 104 (FIG. 5) held between the feed wheels.

Note that all of the structure described thus far in detail, with the exception of the first drive shaft 30, is arranged on the table 26 for reciprocation therewith. Thus, the wire translation means, i.e., the parts needed to move a wire axially to and from the blades, is not disturbed by the motion of the wire rotation means, i.e., the parts needed to rotate a wire about its axis.

The wire rotation means effects rotation of the wire by reciprocation of the feed wheels, one in and one out. That is, in addition to rotating, the shafts 30, 32 (and therefore the feed wheels) reciprocate by moving axially in and out of the front wall. The structure for effecting the reciprocation includes a motor bracket 106 fixed to the base plate 12 and supporting a stepper motor 108. A rod support block 110 is bolted to the bracket 106. Block 110 has upper and lower bores for receiving rods 112 which are held by set screws. A limit switch 114 is attached to the top edge of the bracket 106.

A slide 116 has a central opening which allows the slide to fit around the rod support block 110. The slide has bushings which receive the rods 112, permitting sliding motion of the slide on the rods. An actuator 118 attached to the slide is engageable with the limit switch 114. The limit switch provides a signal to the controller that the normal rest position of the feed wheels has been reached.

Figure 6:
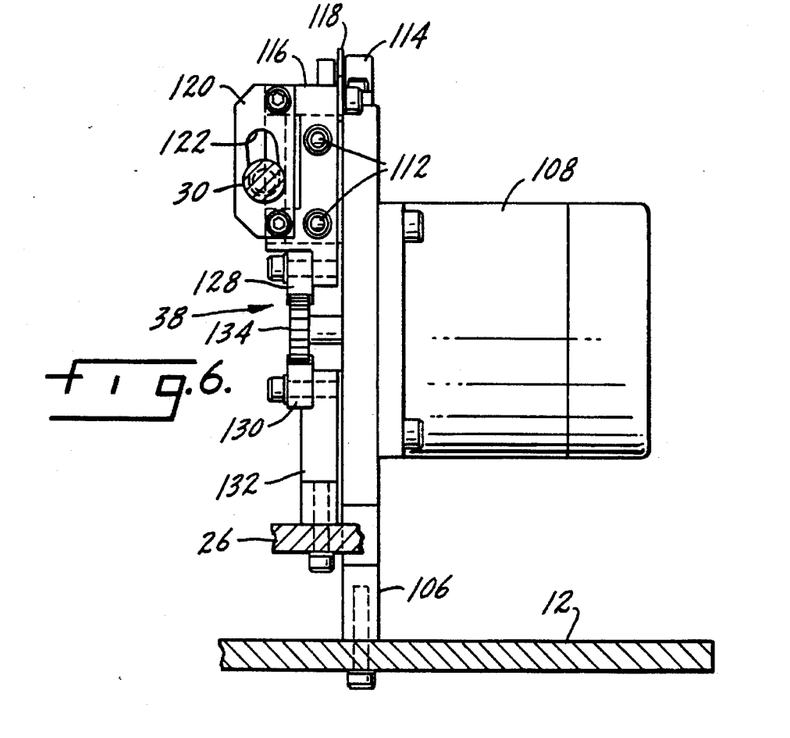
FIG. 6 is a section taken along line 6—6 of FIG. 3.

The front edge of the slide 116 mounts a bracket 120. This bracket has an elliptical opening 122 (FIG. 6) through which a turned down end portion of the shaft 30 extends. The turned down portion of the shaft has an axial length slightly greater, on the order of 0.010", than the thickness of the bracket 120. The full diameter portion of the shaft 30 does not fit through the opening 122. Opening 122 generally describes the arc on which the first drive shaft 30 pivots about idler shaft 66 for adjustment of the shaft position. A bolt 124 threads into shaft 30 to fasten a washer 126 to the end face of the turned down portion. Since the length of the turned down portion is greater than the thickness of the bracket, there is clearance between the washer and the bracket, allowing rotation and pivoting of the shaft but constricting it to axial movement with the slide 116.

The slide 116 carries a rack 128. A similar rack 130 is attached to a table bracket 132. The table bracket is bolted to the table 26. A pinion 134 is fixed to the shaft of stepper motor 108. It engages the racks 128, 130 for creating opposing reciprocating motion of the table 26 and the slide 116. The slide, of course, carries the first drive shaft 30 with it by virtue of the bolted connection of the shaft and slide. Looking now at the cutting blade drive means 40 in FIGS. 1, 2 and 7, the blade mounting shafts 42 and 44 extend through opening in the front wall 14 to mount blade holders 136 and 138. The blade holders carry V-notch shaped blades 140 and 142. Inside the wall the shafts 42 and 44 are supported by linear bearings 144 in bearing blocks 146, 148. The bearing blocks are attached to a drive wall 150 which is mounted on a riser plate 152. The riser plate 152 is supported on the base plate 12 by spacers 154 (FIG. 2).

Figure 7:
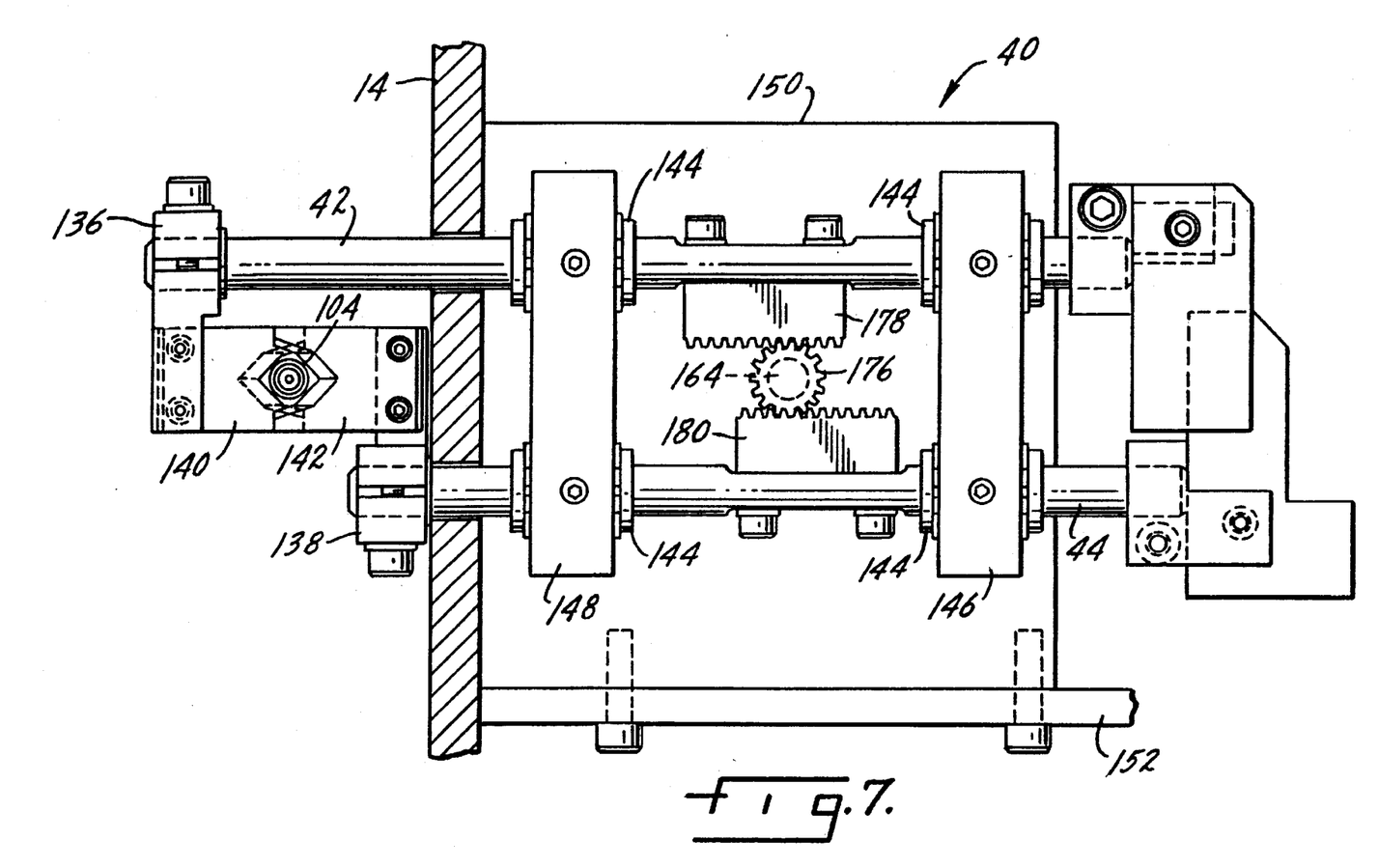
FIG. 7 is a side elevation, on an enlarged scale, of the cutting blade actuating mechanism.

On the side of the drive wall 150 opposite the bearing blocks are a pair of spacers 156 and a bearing plate 158. The bearing plate 158 has an opening for receiving bearing 160. An opening in wall 150 has a bearing 162 which, together with bearing 160 supports a pinion shaft 164. Shaft 164 has a pulley 166 mounted on it. The pulley is driven by a stepper motor 168 through belt 170, speed reducer 172 and a timing belt 174. The end of shaft 164 carries a pinion 176 that engages racks 178 and 180 fastened to the blade mounting shafts 42 and 44, respectively. Rotation of pulley 166 causes rotation of pinion 176 and racks 178, 180, thereby causing reciprocation of the blade mounting shafts and the cutting blades thereon.

It will be understood that wire guiding devices are preferably employed, although not shown, to direct a wire into the cutting zone of the blades. Initial setup of the machine involves manually feeding a wire, such as from a supply roll, into the bight of the feed wheels and through the guiding device. The separation of the feed wheels is also adjusted as appropriate for the wire size.

The operation of the invention is controlled by a computer in the electronics module 20. The computer is programmed to operate the machine in the following manner. A user is asked to input through the control panel the parameters for a particular job. For example, suppose a normal wire is being stripped to expose a half inch bare wire. The computer activates one of the motors 90. The motor turns pulley 96 which in turn causes the timing belt 94 to revolve around the pulleys 100 and 102. Pulley 102 rotates drive shaft 32 and feed wheel 36 in one direction. Pulley 100 rotates drive shaft 30, through spur gears 68 and 86, and feed wheel 34 in the other direction. Rotation of the feed wheels advances the wire 104 to the cutting blades. This advancement continues until the end of the wire is a half inch past the blades cutting edges. Then computer stops the motor 90 to lock it in place. Next the computer turns on motor 168 which closes the blades through rotation of belt 170, reducer 172, belt 174, pulley 166, shaft 164 and pinion 176. The pinion causes reciprocation of the shafts 42 and 44 by means of racks 178 and 180. Once the blades have closed to a depth that cuts through the insulation thickness, the motor 168 is stopped so the blades are held closed.

Since the blades are V-notch shaped, they form a square about the wire which cuts through most but not all of the insulation. To make a full encircling cut around the insulation, the wire is rotated with the blades closed. This is done by activating one or both of the motors 108. The engagement of pinion 134 with racks 128 and 130 causes the table 26 to move transversely to the wire axis in one direction while the first drive shaft 30 moves in the opposite direction. The resulting reciprocating motion of the feed wheels rotates or rolls the wire about its axis. With the cutting blades closed, this rolling action of the wire completes the encircling cut.

Then the motor 108 is reversed to return the feed wheels to their original position. Next motor 90 is activated in the reverse direction to retract the wire. Since the cutting blades are still closed and in engagement with the slug, this retraction results in removal of the slug. Once the slug is removed motor 90 is stopped and motor 168 is activated long enough to open the cutting blades. Then motor 90 is reactivated to advance the wire out of the area of the cutting blades and into the bight of the other set of feed wheels. The second set grasps the wire for purposes of cutting the wire to length and stripping the trailing end. A similar sequence of motor activation is used to strip the trailing end with the wire being rotated in the closed blades to make an encircling cut.

The computer will be programmed so that motors 90 and 108 cannot be activated at the same time. Thus, the machine will not advance a wire at the same time that the wire is being rotated. Wire rotation only occurs while the wire is stationary along its axis. However, in an alternate embodiment, motor 108 may be activated prior to motor 168. In fact, motor 108 may be cycled back and forth to rotate the wire in alternate directions while motor 168 closes the blades. This causes the cutting edges of the blades to close radially on a rotating wire, thereby permitting the cutting edges to Slice the insulation tangentially, rather than moving directly radially into the insulation. For some types of insulation material, this method may prove preferable.

Whereas a preferred embodiment of the invention has been shown and described, it will be realized that alterations can be made thereto without departing from the scope of the following claims.

We claim:

1. In a wire processing machine for removing insulation from wires, the machine having cutting means movable radially of the wire to a selectably adjustable depth for cutting through less than the full circumference of the wire's insulation, wire translation means engageable with the wire for gripping and moving the wire axially toward and away from the cutting means, and rotation means for rotating the wire about the axis of the wire, an improved method of removing insulation comprising the steps of:

a) operating the wire translation means to advance a wire to the cutting means at the desired position for cutting;

b) closing the cutting means on the wire to the desired depth to cut a first portion of the insulation's circumference, and then maintaining the cutting means stationary;

c) activating the rotation means with the cutting means closed and stationary to rotate the wire sufficiently to cut the remaining portions of the insulation's circumference, thereby forming an insulation slug; and d) operating the wire translation means with the cutting means closed and stationary to retract the wire and remove the insulation slug.

2. The method of claim 1 further comprising the steps of opening the cutting means after slug removal and then operating the wire translation means to move the wire to a subsequent processing location.

3. The method of claim 1 further comprising the steps of providing cutting means having a pair of V-notch shaped cutting blades and rotating the wire between 90 degrees and about 100 degrees.

4. In a wire processing machine for removing insulation from wires, the machine having cutting means movable radially of the wire to a selectably adjustable depth for cutting through less than the full circumference of the wire's insulation, wire translation means engageable with the wire for gripping and moving the wire axially toward and away from the cutting means, and rotation means for rotating the wire, an improved method of removing insulation comprising the steps of:

a) operating the wire translation means to advance a wire to the cutting means at the desired position for cutting;

b) closing the cutting means on the wire to the desired depth to cut a portion of the insulation's circumference;

c) if the entire insulation circumference has not yet been cut, opening the cutting means and activating the rotation means with the cutting means open to rotate the wire sufficiently to present a remaining uncut portion of the insulation's circumference to the cutting means and repeating step b;

d) operating the wire translation means with the cutting means closed to retract the wire and remove the insulation slug.

5. The method of claim 4 further comprising the steps of opening the cutting means after slug removal and then operating the wire translation means to move the wire to a subsequent processing location.

6. A wire processing machine for removing insulation from wires, comprising:

a frame;

cutting means mounted on the frame and movable radially of the wire to a selectably adjustable depth for cutting through less than the full circumference of the wire's insulation;

a table mounted for reciprocating motion on the frame;

a first drive shaft mounted on the table for rotation about an axis of the first drive shaft and reciprocation relative to the table along said axis;

a second drive shaft mounted on the table for rotation about the second drive shaft's axis;

wire rotation means mounted on the frame and connected in driving relation to the table and first drive shaft to cause reciprocating motion of the table relative to the frame in one direction and the first drive shaft relative to the table in the opposite direction;

turning means mounted on the table for rotating the first and second drive shafts;

first and second feed wheels mounted on the first and second drive shafts respectively, the feed wheels being engageable with a wire to be stripped for moving the wire axially toward and away from the cutting means and for rotating the wire.

7. In a wire processing machine for removing insulation from wires, the machine having cutting means movable radially of the wire to a selectably adjustable depth for cutting through less than the full circumference of the wire's insulation, wire translation means engageable with the wire for gripping and moving the wire axially toward and away from the cutting means, and rotation means for rotating the wire about the axis of the wire, an improved method of removing insulation comprising the steps of:

a) operating the wire translation means to advance a wire to the open cutting means at the desired position for cutting and then maintaining the wire axially stationary;

b) activating the rotation means to rotate the wire;

c) closing the cutting means on the rotating wire to the desired depth to cut the insulation, the rotation of the wire causing the cutting means to cut the insulation's full circumference, thereby forming an insulation slug; and d) operating the wire translation means with the cutting means closed and stationary to retract the wire and remove the insulation slug.

* * * * *